Patented June 22, 1937

2,084,323

UNITED STATES PATENT OFFICE 2,084,323

ALCOHOL REPELLENT COMPOSITIONS AND PROCESS FOR THE MANUFACTURE THEREOF

Emile C. De Stubner, New York, N. Y.

No Drawing. Application June 11, 1934, Serial No. 730,070

REISSUED

6 Claims. (Cl. 106—37)

This invention has as one of its objects the impartation of alcohol-resistant qualities to compositions such as molding compounds, plastics, insulating materials, lacquer, paint, varnish, enamels, etc. As the group of alcohols includes many members of this family of chemical compounds, I use the term herein as primarily restricted to methyl alcohol, ethyl alcohol and propyl alcohols, which are met with in the market as wood alcohol, denatured alcohol, and as constituents of many cleaning fluids, anti-freeze compounds, polishes, etc.

It is also an object of the invention to provide a preparative treatment for composition constituents such as plasticizers, softeners, pigments, fillers, resins, solvents, diluents, extenders, cellulose derivatives in form of cellulose esters, cellulose ethers as basic materials in the manufacture of smokeless powder, photographic films, celluloid, artificial leather, talking machine records, sound records, coating compositions, buttons, etc., to make such constituents alcohol repellent.

Before the above-named materials become suitable constituents for such compositions, it is necessary to obtain them in a condition free from water and excess moisture. This dehydration is an important step in their preparation as compounding elements. Nitrocellulose, particularly that which during its earlier processing stages comes in contact with large amounts of water, must be thoroughly dehydrated before it is useful as a composition constituent.

In my co-pending application Serial 590,319, filed February 1, 1932, (issued since filing the present application as United States Patent No. 1,965,764), I have disclosed and claimed dehydration or converting processes broadly and in a generic way when I refer to the treatment of water-wet finely divided solids. In another application, Serial 333,523 (now United States Patent 1,955,738) I more specifically disclose and claim pigments as being the finely divided solids to be processed in accordance with my processes.

In the present invention I now specifically name soluble celluloses such as nitrocellulose, cellulose acetate, cellulose ethers and cellulose esters generally when containing water. These substances exist primarily in the form of dispersions in an aqueous media similar to the disperse systems disclosed and claimed in said application and patent respectively. The principles underlying my therein-disclosed processes are equally applicable to the preparative treatment of water-wet cellulose derivatives such as water-wet nitrocellulose or others.

Since the products of this invention are mostly of pasty or plastic consistency, I find that a kneading machine for operation under vacuum is the most suitable apparatus. This machine consists essentially of a rectangular trough curved at the bottom to form two half cylinders, carrying two blades and a perforated pipe on a saddle which divides the two half cylinders. The trough is provided with a jacket as is the cover to prevent condensation of vapors on its under side. In the cover are two plate glass observation windows, and a manifold with swinging joints for connection to condenser, receiver and vacuum line. The trough is fitted with a pyramid, counter-balanced cover, carrying a suitable gasket to afford an air-tight connection with the trough. The mixing blades are hollow and heatable and may be perforated to permit agitation both mechanical as well as by gases blown through perforation. The mixing blades are so designed and located that they sweep the entire area of the half cylinders on each revolution and revolving toward each other at unequal speeds and so pass the material back and forth from one to the other. In addition to this complete mixing action, an intensive kneading action is performed simultaneously by the squeezing and pulling of the material against the trough walls, the saddle in the bottom of the trough and between the blades themselves. Through one end of the trough is inserted a thermometer-well so that the stem is fully submerged in the mass being mixed. In the cover are openings for vacuum cocks, gauge and thermometer to measure the temperature of the vapors. When used for the dehydration processes of water-wet nitrocellulose disclosed herein, such apparatus permits replacement or evaporation of the aqueous medium in the presence of a replacing agent. By this means the nitrocellulose is maintained in a wetted condition at all times and finally remains in the apparatus wetted with the selected replacing agent and freed of substantially all of the alcohol or water with which the cellulose originally was wetted.

By processing water-wet nitrocellulose in such a machine with a toluene-camphor solution as the replacing agent, a water-free nitrocellulose plastic will result. By selecting the proper type of nitrocellulose and regulating the amount of camphor to the desired quantity required for photographic film bases, this plastic composition will furnish not only films which are free from water but free from alcohol as well. Again when selecting a lacquer-type nitrocellulose and using a toluene solution of di-butylphthalate as the water replacing agent, the result also will be a water-free and alcohol-free lacquer base. In order to obtain the pigmented lacquer base for colored lacquers one only needs to start with pigmented nitrocellulose which latter is the subject matter of my co-pending application, Serial 669,572, filed May 5, 1933, and my United States Letters Patent No. 1,795,764 and No. 1,914,489.

When compounding lacquers or making films, whether they are clear or colored with soluble colors or insoluble pigments, it is of utmost importance that the solid composition constituents, i. e. soluble cellulose, resins, plasticizers, pigments, and the volatile and liquid components such as solvents and diluents, are properly balanced and selected. However, when building up the nitrocellulose lacquer from alcohol-wet nitrocellulose, which at present is the usual commercial form of this important basic material, then the compounder is already deprived of his freedom of selection of such materials because he has constantly to take into consideration the alcohol contained in the commercial nitrocellulose which will average as much as thirty percent. Thus it will be seen that in a gallon of lacquer which contains usually eighteen ounces of nitrocellulose on the dry basis, there are incorporated almost eight ounces (one-half pint) of alcohol. As alcohol is a hygroscopic substance, I have discovered that it is the cause of the water or moisture content in lacquer or in an ultimate film or the photographic film base or in smokeless powder. I have also discovered that the alcohol is responsible for the "transparent blush" or the "gelled film" which is of poor adherence to sub-surfaces and of poor tensile strength. In addition, alcohol is also subject to oxidation into aldehydes and acids, and thus is the cause for the progressing instability of compounds made from alcohol-wet nitrocellulose. This lack of stability has great and very serious consequences when storing explosives such as smokeless powder or photographic films on a nitrocellulose base.

The present invention discloses methods of processing soluble celluloses such as nitrocellulose to overcome these defects through the elimination of alcohol therefrom.

Should it, however, become desirable to process alcohol-wet nitrocellulose for dealcoholization, then this is accomplished by distillation processes and with distilling apparatus as disclosed and described in my co-pending application Serial 579,662, filed December 7, 1931. In the present application use is made of the known physical and chemical laws governing distillation and uses the difference in vapor pressure and of boiling points for displacement of one volatile compound and its replacement by another. I wish it to be understood that this method which is based on the laws of distillation, includes an important step as far as economics are concerned, particularly on account of condensing evaporated alcohol into its liquid phase and thereby recovering this liquid alcohol, which thus can be directed back into the manufacturing cycle. In the art of compounding compositions with which this invention is chiefly concerned, such distillation steps and the apparatus with which to conduct such distillations are novel. Many a useful apparatus which can come into action only provided the material to be handled by it is of liquid enough consistency, is excluded because such liquid compositions do not lend themselves for application and utilization as end or consumer products, whereas distillation processes bring within economic reach the handling of rather thin liquids which by distilling off the liquid constituents, condensing them into their liquid phase, and recovering the latter thereby are concentrated to any desired consistency. I shall illustrate my point by the following: The colloid mill cannot be brought into action to process heavy or plastic compounds. Diluting such compounds with a volatile solvent prepares them so that they can be handled by the colloid mill. After passing this processing step, i. e. colloid-milling, the treated compound only needs to be distilled to free it from the auxiliary solvent to obtain again the original consistency of the undissolved compound, and yet the original heavy and plastic compound is benefited by the treatment of passing it through a colloid mill. In daily life one uses the shoe-horn to place the foot comfortably into the shoe and when this is accomplished the shoe-horn is taken off. In my above description, I may compare the solvent to the shoe-horn, the heavy plastic compound to the foot, the colloid mill to the shoe, and the distillation process to the step of taking off the shoe-horn.

The foregoing processes may be used to furnish the compounder with soluble celluloses free from water and also free from alcohol, and of consistencies depending upon the character as well as the amount of replacing agent left in the mass. Thus, if desired, the fibers of nitrocellulose may, during processing, be swelled and gelatinized by selecting a toluene plasticizer solution as replacing agent when freeing water-wet or alcohol-wet nitrocellulose from water or alcohol. This disclosed utilization of the principle of replacement or displacement and removing thereby water or alcohol by means of a replacing agent, is also the "modus operandi" when resins, such as gum dammar, ester gum, copal esters like congo glycerine ester, salts of resin acids or the acid itself, synthetic resins like "Glyptals" and their mixtures with pigments such as carbon black, Prussian blue, etc. are to be obtained free from water or alcohol or benzol or any other solvent or diluent to give place to the desired substitution or replacing agent and ingredient.

In the foregoing I have disclosed methods, processes and apparatus which utilize the laws of physics as means for dehydration and de-alcoholization, i. e. by replacement and displacement. I shall now disclose processes for dealcoholization by the application of the laws of chemistry, i. e. by "reacting away" the alcohol. The following example will illustrate the process.

Place one hundred pounds of commercial alcohol-wet nitrocellulose into the above-described apparatus which is preferably made of aluminum. While the machine is closed and agitators are kept going, add the calculated amount of concentrated acetic acid necessary to transform the alcohol contents of the alcohol-wet nitrocellulose into ethyl-acetate, the ester. It is optional to what extent one wishes to modify the alcohol by simply regulating the amount of acid. Ethyl-acetate, being an effective solvent for nitrocellulose, of course produces a nitrocellulose solution which in this case is rather stiff, and therefore the kneading action of the agitators is required. Now add sufficient toluene or solvent naphtha to facilitate mixing of the mass of reaction, which now consists of nitrocellulose, ethyl-acetate, toluene, and also the water of reaction between the alcohol and acid, and also perhaps some free acid. The undesired by-products are now distilled off and in the apparatus remains the compound of nitrocellulose dissolved in ethyl-acetate which, if so desired, may be extended with toluene.

My invention, therefore, consists not only in de-alcoholizing alcohol-wet nitrocellulose, but also in the making of solutions or dopes from the alcohol-wet raw material by means of chemically transforming a wetting agent into a solvent.

Another instance of "reacting away" alcohol in alcohol containing substances is by transforming the alcohol into the corresponding aldehyde or acid by oxidation. A methyl alcohol-wet filler may thus become a desirable constituent of a resinous compound during the formation of the resin when this is of the phenol-formaldehyde condensation class. The formaldehyde is in this case furnished by oxidizing the methyl alcohol filler mixture.

Another method of de-alcoholization by physical means but differing from the above method insofar as the alcohol is removed in the liquid phase by the action of an alcohol-immiscible replacing or displacing agent, is the following. Such an agent I found in acetyl-ricinolein, the product of acetylation of castor oil, which is the subject matter of my application, Serial 307,553, filed September 21, 1928. This ester is insoluble in and immiscible with commercial ethyl alcohol or denatured alcohol and it (the ester) is also an excellent plasticizer or softener for nitrocellulose. I have now discovered that by kneading together commercial nitrocellulose containing about thirty percent of alcohol and this castor oil ester, so that the mixture becomes a plastic dough-like mass, the alcohol will be found as a puddle on top of this mass from which it can be easily poured off.

I claim therefore also as my invention the process which utilizes alcohol-immiscible or insoluble plasticizing agents or softeners to dissociate alcohol from alcohol-wet soluble celluloses, and any separating process of alcohol in the liquid phase utilizing alcohol-immiscible and alcohol-insoluble displacing or replacing agents falls within the scope of my invention.

I shall now disclose by way of examples the means by which alcohol-resistant qualities are imparted to compositions when alcohol-insoluble or alcohol-immiscible components are incorporated into such compositions. It is important to the compounder to have access to alcohol-free composition constituents for only with such constituents can alcohol-insoluble and alcohol-immiscible constituents be incorporated. Since alcohol-insoluble and alcohol-immiscible composition constituents are precipitated from their solutions by the addition of alcohol, they will make compositions in which they are incorporated shed alcohol should this come in contact with such compositions. Therefore, lacquer, photographic films, smokeless powder, coating compositions, plastics, etc., when made with alcohol-free and alcohol-insoluble and alcohol-immiscible constituents, become thereby alcohol-proof and their stability is greatly increased. It is well known to automobile owners that in winter, due to occasional spilling of some anti-freeze compound, the hood of a car becomes spotty and often the paint comes off. This is caused by the alcohol contained in the anti-freeze compound. Would such automobile have been painted with a coating composition made in accordance with my disclosures, the spilling of anti-freeze would have no effect.

Lacquer manufacturers who wish to incorporate gum dammar into nitrocellulose lacquers know that the commercial resin must undergo a preparative treatment before it can become a lacquer constituent. This treatment consists in dissolving the resin or gum in toluene and then adding denatured alcohol to this fairly concentrated solution. This addition precipitates the alcohol-insoluble part of the resin which amounts to about twenty-five to thirty per cent of the commercial gum and is regarded a total loss. Often this treatment is referred to as "de-waxing", but the precipitate is not a wax, it is the B-resin of the dammar resin which is insoluble in alcohol. (See Thorpe, Chemical Dictionary under "Resins".) In contradistinction to present methods, I can utilize the commercial form of gum dammar as it is, because in compositions made in accordance with my disclosures there is no alcohol present which could cause the precipitation of this alcohol-insoluble fraction contained in gum dammar. The presence of this fraction in compositions is in fact highly desirable because it imparts alcohol-resistance to them. Thus it will be seen that the advantages of my processes are manifested by a product of improved qualities, which product costs less to manufacture than is the cost of production according to present methods. Of course, this insoluble fraction of the gum dammar may be separated as by present methods and it may then be made a composition constituent in accordance with above disclosures. The other part of the dammar which contains hydroxyl groups and is of acid character, lends itself to acetylation and the acid character may be modified either by esterification, e. g. with glycerine, or salt formation, e. g. by treatment with slaked lime.

I have found that when treated with acetic acid or acetic-anhydride or equivalents, the gum dammar, and still more so the fraction separated from the B-resin, exerts plasticizing and softening action upon the fibers of nitro-cellulose and therefore becomes useful in the manufacture of celluloid, photographic films, lacquer, coating compositions, plastics, artificial leather, etc.

The absence of alcohol in nitrocellulose also permits the incorporation of coumar-resins into such alcohol-free nitrocellulose compositions whereby the property of alcohol-repellence is imparted to such compositions.

The above disclosure regarding acetylation or acid treatment of gum dammar also is applicable to other resins such as Congo-copal, Zanzibar-copal, Manila-copal, or their solutions, and also to other organic compounds particularly the polyvalent metal salts of hydroxy fatty acids such as are derived from caster oil, rape-seed oil, wool-fat, etc..

I have found that such metal salts as for instance acetyl-lead ricinoleate, exert a particular protection to a clear film of nitrocellulose against the destructive action upon it by light rays. Other metals may take the place of lead, such as calcium, zinc, aluminum, etc. One can compare this protective behavior to the action of metal foils toward X-rays which are prevented thereby from passage through an object.

I claim:

1. In the preparative treatment of alcohol-wet nitrocellulose for incorporation into alcohol-free compositions, the steps which include removing the alcohol by bringing a suitable quantity of the alcohol-wet nitrocellulose into intimate contact with a displacing agent for the alcohol and thereafter distilling off the alcohol under diminished pressure, condensing the distillate and continuing said distillation and condensation until the nitrocellulose is freed from alcohol and dispersed in the displacing agent as the dispersion medium.

2. A process for the production of alcohol-repellent cellulosic products from alcohol-wet nitrocellulose, which comprises continuously evaporating the alcohol and replacing the alcohol with alcohol-immiscible replacing agents non-volatile under the conditions obtaining for the evaporation of the alcohol.

3. A process for the production of alcohol-repellent cellulosic products which includes the novel steps of providing a suitable quantity of alcohol-wet nitrocellulose, and continuously replacing the alcohol with a polyvalent metal salt of an hydroxy fatty acid.

4. A process for the production of alcohol-repellent cellulosic products which includes the novel steps of providing a suitable quantity of alcohol-wet nitrocellulose, and continuously replacing the alcohol with acetyl lead ricinoleate.

5. A process for the production of aqueous alcohol-repellent cellulosic products from alcohol-wet nitrocellulose, which includes the novel steps of continuously replacing the alcohol therein with toluene while continually evaporating and removing the alcohol.

6. A process for the production of aqueous alcohol-repellent cellulosic products, which includes the novel step of replacing an alcoholic dehydrating agent with a toluene solution of dibutyl phthalate, and thereafter removing the alcoholic dehydrating agent from the mass.

EMILE C. DE STUBNER.